March 21, 1933. R. B. HOOVER 1,901,967
ANTIFRICTION BEARING
Filed Aug. 7, 1931
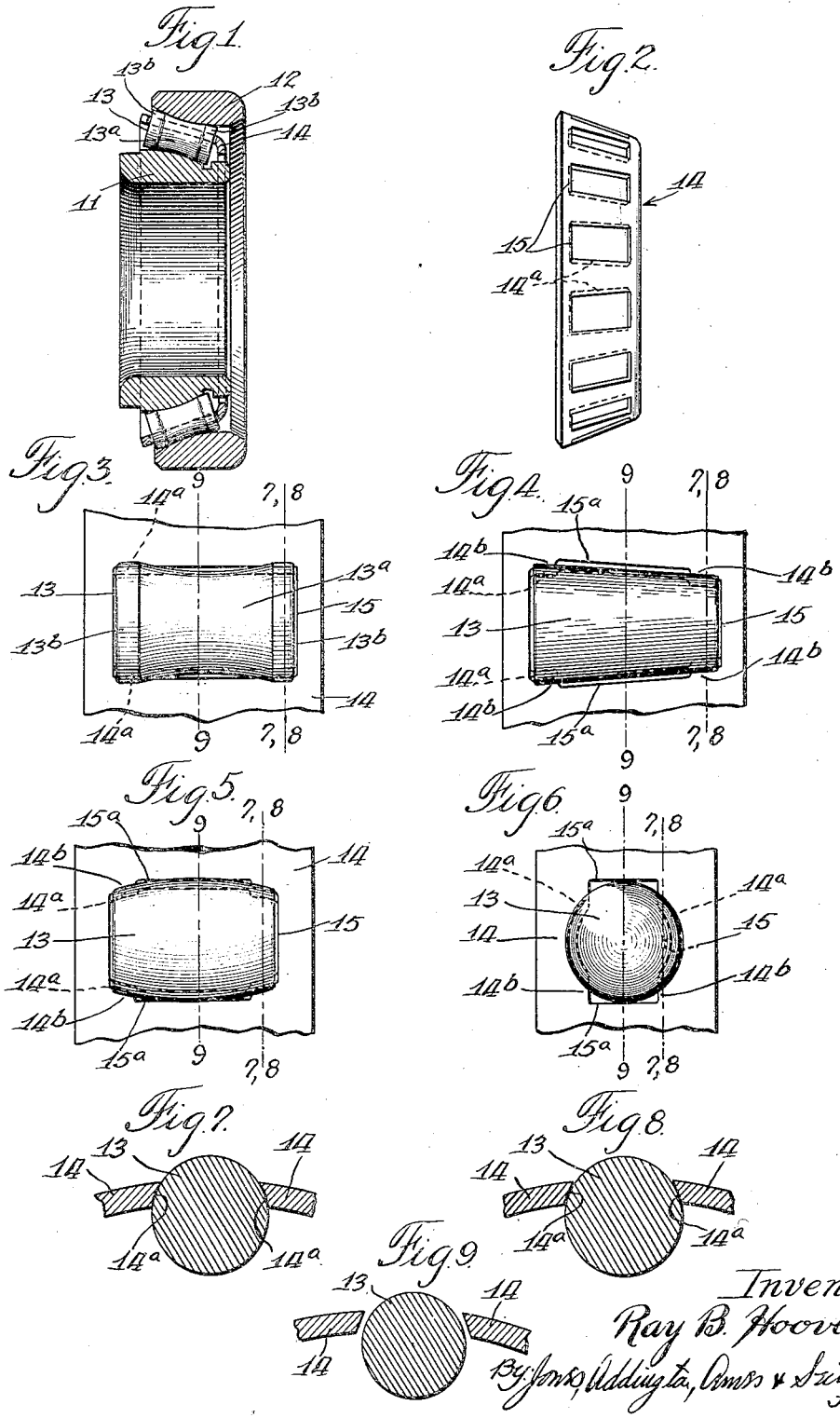
Inventor
Ray B. Hoover
By Jones, Addington, Ames & Seibold
Attys Patented Mar. 21, 1933

1,901,967

UNITED STATES PATENT OFFICE

RAY B. HOOVER, OF OAK PARK, ILLINOIS, ASSIGNOR TO SHAFER BEARING CORPORATION, OF CHICAGO, ILLINOIS, A CORPORATION OF ILLINOIS

ANTIFRICTION BEARING

Application filed August 7, 1931. Serial No. 555,707.

This invention relates to improvements in anti-friction bearings and has particular relation to an improved type of construction or formation of the retaining members or cages utilized in such bearings.

Many of the anti-friction bearings heretofore in use have embodied retaining members or cages which contact with the rolling elements of the bearings across part or all of the bearing surfaces thereof. Bearings constructed in this manner have been subject to difficulties resulting from insufficient lubrication due to the removal of lubricant from the rolling elements, especially at central points thereof where heaviest loads are carried, by reason of the scraping contact of the retainers therewith. Difficulties have also been encountered in the skewing of the rollers out of proper alignment by reason of the inability of the retainers to maintain the proper alignment where the guiding action of such retainers is applied only at intermediate points along the rollers or where the construction is such that the retainers rapidly become so worn at points of contact with the ends of the rolling elements and points adjacent thereto that the proper guiding action cannot be obtained.

The primary object of the present invention is to provide an anti-friction bearing in which the retaining member for the rolling elements is so designed as to avoid the above-mentioned difficulties.

The above and other desirable objects and results are accomplished according to the present invention by so designing the retaining member or cage of the bearing in such manner that the rolling elements are guided by peripheral contact with the retaining member only at the end portions of the rolling elements, while the main bearing surfaces of the rolling elements are free of contact with the retainer.

The invention will be better understood by reference to the following detailed description, taken in conjunction with the accompanying drawing, in which Figure 1 is a sectional view of a bearing embodying the invention, taken along a plane including the axis of the bearing;

Fig. 2 is a side elevational view of a retaining member or cage formed in accordance with the invention;

Fig. 3 is an enlarged, fragmentary, plan or elevational view showing one of the rolling elements of the bearing illustrated in Fig. 1 in operative relation to the adjacent portions of the retaining member of the bearing, this view being taken from inside the retaining member, looking outwardly; so that the rolling element appears in front of the portions of the retaining member which are adapted to contact therewith;

Figs. 4, 5 and 6 are views similar to Fig. 3 but illustrating the application of the invention to bearings utilizing different types of rolling elements;

Figs. 7 and 8 are fragmentary, sectional views taken along the lines 7, 8—7, 8 of Figs. 3, 4, 5 and 6 and illustrating two different ways in which the contacting edges of the retaining members may be formed; and Fig. 9 is a fragmentary, sectional view taken along the lines 9—9 of Figs. 3, 4, 5 and 6.

The bearing illustrated in Fig. 1 comprises an inner bearing member 11 and an outer bearing member 12, between which a plurality of bearing rollers 13 are operatively disposed. It will be noted that both the inner and outer bearing members present convex bearing surfaces to the rollers, which latter are formed with concave bearing surfaces 13a intermediate the ends thereof and extending over a major portion of the length of the rollers. This type of construction is of particular advantage where the bearing surface of the inner bearing member 11 is formed to constitute a portion of a sphere, whereby the bearing is self-aligning, as is now well understood in the art. The rollers 13 are also preferably formed with substantially cylindrical end portions 13b.

The rollers 13 are maintained in their proper relative positions by a retaining member or cage 14 which is shown in more detail in Fig. 2. This retaining member is of frusto-conical formation corresponding to the inclination of the rollers 13 as shown in Fig. 1. An aperture 15 is formed in the retaining member 14 for each of the rollers 13. These apertures are of substantially rectangular shape whereby the longitudinal edges thereof contact with the rollers 13 only along the cylindrical end portions 13b of said rollers, the concave bearing surfaces 13a of the rollers being bridged by the continuing straight edges of the apertures without contact therewith.

Fig. 3 shows one of the rollers 13 in operative relation to the adjacent portions of the retaining member 14. It will be seen that the corresponding aperture 15 is of such size as to receive the roller 13 with the longitudinal edges of said aperture coming in contact with the cylindrical end portions 13b of the roller. These edges are undercut to provide arcuate or sloping surfaces 14a for contact with the roller portions 13b.

The arcuate formation of these surfaces is illustrated in Fig. 7, while Fig. 8 illustrates the sloping surface formation referred to. In the construction shown in Fig. 7 the contacting edges of the retainer 14 conform to the peripheral curvature of the end portions of the rollers. As shown in Fig. 8, the apertures formed with the sloping edges receive the rollers in such relation that said edges are tangent to the peripheral surfaces of the end portions of the rollers. Either of these types of construction or any modifications thereof may be utilized as desired.

Fig. 9, which is a sectional view taken transversely of one of the rollers substantially at the middle of its length, illustrates the clearance which is provided between the retaining member and the rollers along the bearing surfaces of the latter. It will be understood that this clearance is obtained in a bearing utilizing concave-surfaced rollers, as shown in Figs. 1 and 3, by reason of the reduction in diameter of the rollers along the bearing surfaces thereof below the diameter of the cylindrical end portions of the rollers, while the longitudinal edges of the apertures in the retaining member extend straight across the bearing surfaces in bridging relation thereto and in substantially parallel relation to the axes of the respective rollers.

Figs. 4, 5 and 6, respectively, illustrate the application of the invention to bearings utilizing tapered rollers, convex-surfaced or barrel-shaped rollers, and balls, instead of the concave-surfaced rollers shown in Figs. 1 and 3. In bearings of this type the retaining member 14 is cut away as indicated at 15a to provide enlargements of the apertures 15 in a direction transverse to the axes of the rollers and extending along the main bearing surfaces of the latter. With this construction the said main bearing surfaces of the rollers are likewise cleared of contact with the retaining member, such contact occurring only at the end portions of the rollers which are outside the zone of the main bearing surfaces. The portions of the retaining member which are not cut away are indicated at 14b and these are the only portions of the retaining member which are permitted to come into contact with the peripheral surfaces of the rollers. The sectional views of Figs. 7, 8 and 9 illustrate the relative positions of the rollers and the retaining member at the section lines bearing the corresponding numerals in Figs. 4, 5 and 6, as well as in Fig. 3.

It will be understood that bearings embodying the present invention and utilizing the types of rollers variously illustrated in Figs. 4, 5 and 6 will be provided with appropriate types of bearing members and retaining members which will differ from the corresponding members fully shown in Figs. 1 and 2 only in details of construction which are irrelevant to the present invention. Detailed illustrations of such constructions have, therefore, been omitted herefrom in order to avoid needless multiplicity of drawings and verbosity of description.

It is to be understood that the use of the term "rollers" in the specification and claims hereof includes all of the types of rolling elements illustrated in Figs. 3, 4, 5 and 6 and also all other types of rolling elements which may be utilized in anti-friction bearings. It is also desired to point out that the term "main bearing surfaces", as used herein in reference to the rollers, is intended to designate the principal portions of the peripheral surfaces of the rollers intermediate the end portions thereof, as distinguished from said end portions, which latter perform comparatively little or no function in directly supporting the load carried by the bearing.

From the foregoing disclosure it will be seen that the present invention provides for the construction of a retaining member or cage for any type of anti-friction bearing whereby the bearing rollers are permitted to come into contact with the retaining member only at the end portions of the rollers and not along the main bearing surfaces thereof. This type of construction avoids the difficulties incident to the scraping of lubricant off the main bearing surfaces of the rollers by the retaining members, and, in the case of any bearing utilizing rollers other than balls, provides for guiding of the rollers at the end portions thereof and thereby minimizes skewing and misalignment of the rollers. These features have been found by extensive tests to be of great importance in increasing the life of bearings embodying the present invention over those heretofore used.

It will be apparent to those skilled in the art that various changes and modifications other than those specifically suggested herein may be made in the details of construction and arrangement of parts of bearings embodying this invention, without departing from the spirit and scope of said invention, as set forth in the appended claims.

What is claimed as new and is desired to secure by Letters Patent, therefore, is:

1. An antifriction bearing comprising a plurality of bearing members, bearing rollers cooperating therebetween and having bearing portions with concave surfaces intermediate their ends and guiding portions at their ends, and an apertured retaining member for said rollers, the apertures in said retaining member receiving said rollers and being of such shape that the edges thereof contact with said guiding portions of the rollers but not with said bearing portions thereof.

2. An antifriction bearing comprising a plurality of bearing members, bearing rollers cooperating therebetween and having bearing portions with concave surfaces intermediate their ends and guiding portions at their ends and an apertured retaining member for said rollers, the apertures in said retaining member receiving said rollers and having edges contacting with said guiding portions of the rollers but extending in substantially straight lines parallel to the axes of the respective rollers across the concave bearing portions of said rollers, whereby clearance is provided between said retaining member and the bearing surface of each of said rollers.

3. An antifriction bearing comprising a plurality of bearing members, bearing rollers cooperating therebetween and having substantially cylindrical end portions and intermediate bearing portions with concave surfaces, and an apertured retaining member for said rollers, the apertures in said retaining member receiving said rollers and being of such shape that the edges thereof contact with said end portions of the rollers but not with said intermediate bearing portions thereof.

4. An antifriction bearing comprising a plurality of bearing members, bearing rollers cooperating therebetween and having substantially cylindrical end portions and intermediate bearing portions with concave surfaces, and an apertured retaining member for said rollers, the apertures in said retaining member receiving said rollers and being of substantially rectangular shape, whereby the edges thereof contact with said end portions of the rollers but not with said intermediate bearing portions thereof.

5. An antifriction bearing comprising a plurality of bearing members, bearing rollers cooperating therebetween and having bearing portions with concave surfaces intermediate their ends and guiding portions at their ends, and an apertured retaining member for said rollers, the apertures in said retaining member receiving said rollers and being of such size and shape that the edges thereof contact with said guiding portions of the rollers at a substantial distance outwardly beyond the axes of the rollers, but do not contact with said bearing portions of the rollers.

6. An antifriction bearing comprising a plurality of bearing members, bearing rollers cooperating therebetween and having bearing portions with concave surfaces intermediate their ends and guiding portions at their ends, and an apertured retaining member for said rollers, the apertures in said retaining member receiving said rollers and having edges contacting with said guiding portions of the rollers at a substantial distance outwardly beyond the axes of the rollers but extending in substantially straight lines parallel to the axes of the respective rollers across the concave bearing portions of said rollers, whereby clearance is provided between said retaining member and the bearing surface of each of said rollers.

7. An antifriction bearing comprising an outer bearing member, an inner bearing member having a substantially spherically curved surface, bearing rollers cooperating between said bearing members and having substantially cylindrical end portions and intermediate portions with concave surfaces bearing on said substantially spherically curved surface of said inner bearing member to accomodate a self-aligning action of the bearing, and an apertured retaining member for said rollers, the apertures in said retaining member receiving said rollers and being of such size and shape that the edges thereof contact with said substantially cylindrical end portions of the rollers at a substantial distance outwardly beyond the axes of the rollers, but do not contact with said intermediate concave-surfaced portions of the rollers.

8. An antifriction bearing comprising an outer bearing member, an inner bearing member having a substantially spherically curved surface, bearing rollers cooperating between said bearing members and having substantially cylindrical end portions and intermediate portions with concave surfaces bearing on said substantially spherically curved surface of said inner bearing member to accommodate a self-aligning action of the bearing, and an apertured retaining member for said rollers, the apertures in said retaining member receiving said rollers and being of substantially rectangular shape and of a width substantially less than the diameter of said substantially cylindrical end portions of the rollers, whereby the edges of said apertures contact with said end portions of the rollers at a substantial distance outwardly beyond the axes of the rollers, but do not contact with said intermediate concave-surfaced portions of the rollers.

In witness whereof, I have hereunto subscribed my name.

RAY B. HOOVER.